(12) United States Patent
Abad Reguera

(10) Patent No.: US 12,220,786 B2
(45) Date of Patent: Feb. 11, 2025

(54) METHOD FOR PRODUCING A GLASS SUBSTRATE WITH AN EMBOSSED SURFACE FINISH AND GLASS SUBSTRATE OBTAINED USING SAID METHOD

(71) Applicant: TVITEC SYSTEM GLASS. S.L., Madrid (ES)

(72) Inventor: Victor Abad Reguera, Leon (ES)

(73) Assignee: TVITEC System Glass SL, Madrid (ES)

(*) Notice: Subject to any disclaimer, the term of this patent is extended or adjusted under 35 U.S.C. 154(b) by 799 days.

(21) Appl. No.: 17/422,593

(22) PCT Filed: Jan. 21, 2019

(86) PCT No.: PCT/ES2019/070025
§ 371 (c)(1),
(2) Date: Jul. 13, 2021

(87) PCT Pub. No.: WO2020/152373
PCT Pub. Date: Jul. 30, 2020

(65) Prior Publication Data
US 2021/0387308 A1    Dec. 16, 2021

(51) Int. Cl.
*B23C 1/04*    (2006.01)
*B24C 1/04*    (2006.01)
(Continued)

(52) U.S. Cl.
CPC ............... *B24C 1/04* (2013.01); *C03C 3/062* (2013.01); *C03C 3/087* (2013.01)

(58) Field of Classification Search
CPC ............ B24C 1/04; C03C 19/00; C03B 19/00
See application file for complete search history.

(56) References Cited

U.S. PATENT DOCUMENTS 5,427,890 A * 6/1995 Suzuki ............... G03F 7/12
430/167
5,573,446 A * 11/1996 Dey .................. B24C 1/04
451/39
(Continued)

FOREIGN PATENT DOCUMENTS

CN    102199005 A    9/2011
CN    107200482 A    9/2017
(Continued)

OTHER PUBLICATIONS

International Search Report, PCT/ES2019/070025 Mailed Jul. 31, 2019.

*Primary Examiner* — Cynthia Szewczyk
(74) *Attorney, Agent, or Firm* — Calderone McKay LLC.

(57) ABSTRACT

The invention relates to a method comprising the steps of: Abrasion, preferably but non-limited by means of sandblasting which produces mechanical roughing on the surface of the glass substrate, optionally applying a primer on the roughed surface, and applying an ink on this primer by means of screen printing which may be digital inkjet screen printing, drying the injected ink deposited by means of digital screen printing, and performing a tempering process. A glass substrate with an embossed surface finish is achieved which simulates the aesthetic and surface texture of different construction materials, such as stone, wood, granite, marble or porcelain, among others.

10 Claims, 1 Drawing Sheet

(51) Int. Cl.
    *C03C 3/062*     (2006.01)
    *C03C 3/087*     (2006.01)
    *C03C 19/00*     (2006.01)

(56) References Cited

U.S. PATENT DOCUMENTS

| | | | | |
|---|---|---|---|---|
| 5,620,775 | A * | 4/1997 | LaPerre | G02B 5/128 |
| | | | | 428/323 |
| 6,214,424 | B1 * | 4/2001 | Chubb | B41M 7/0072 |
| | | | | 428/34.1 |
| 2007/0064446 | A1 * | 3/2007 | Sharma | G02B 5/22 |
| | | | | 362/330 |
| 2013/0224493 | A1 * | 8/2013 | Gabel | C03B 32/02 |
| | | | | 65/33.1 |

FOREIGN PATENT DOCUMENTS

| | | | |
|---|---|---|---|
| EP | 0345993 | A1 * | 12/1989 |
| ES | 2279667 | A | 8/2007 |

* cited by examiner

METHOD FOR PRODUCING A GLASS SUBSTRATE WITH AN EMBOSSED SURFACE FINISH AND GLASS SUBSTRATE OBTAINED USING SAID METHOD

OBJECT OF THE INVENTION

The object of the present invention, as the title of the invention states, is a method for producing a glass substrate with an embossed surface finish. Another object of the invention is the glass substrate obtained by said method and finally the uses of the glass with an embossed surface finish.

The glass of the present invention is characterised by the special features of each of the steps of the production method, as well as the joint arrangement of all of them, which enables a glass substrate to be obtained that simulates an aesthetic and surface texture of different production materials such as stone, wood, granite, marble or porcelain, among others. As such, it has an embossed surface finish and a matte appearance.

The glass obtained by the method of the invention is also characterised by the special aesthetic and construction features that enable a surface texture of different construction materials to be simulated such as stone, wood, granite, marble or porcelain, among others.

Therefore, the present invention falls within the field of construction materials on the one hand and, on the other hand, within the field of glass treatment methods.

BACKGROUND OF THE INVENTION

In recent years, the industry has been busy in the search for a product obtained from glass which provides a texture and aesthetic that are highly similar to construction materials used in enclosures and claddings (made of stone or ceramic) and which also has a modest cost, is replicable, versatile, lightweight and adaptable to any shape or design, easy to assemble and/or replace, easy to clean and is energy efficient, among others.

Assuming that the textures can only be replicated by using digital inkjet screen printing, the way to provide screen-printed glass with the physical and aesthetic properties necessary to replicate the desired material was researched.

The first path of research focussed on the use of glass on which a metal layer with anti-reflective properties was deposited, which would significantly reduce the characteristic reflection of the glass, such that one of the differentiating elements would be corrected. Nevertheless, even by reducing the reflection of the product to values close to 0%, the surface finish of the product and the smooth surface appearance thereof continued to show the use of glass as a base element. This option was discarded, starting new paths of research and development.

After researching and testing different types of surface finishes, it was decided that the way forward would focus on the use of different glass substrates seeking to provide the glass with a certain surface embossing while at the same time controlling the reflection thereof.

The first tests were carried out by using frosted glass purchased from a supplier, wherein the glass is frosted by applying an acid bath that erodes the outer surface of the glass. The result obtained was closer to the initial claims than any other test carried out; however, the effect was not entirely that which was desired, so the decision was made to continue to study other options, but maintain the path of research.

Even the possibility of applying frosting after applying screen printing was researched and tested; however, the results were negative as expected.

Screen-printed glass is characterised by having vitrifiable enamels deposited on one of the faces thereof by the screen printing system. After printing the drawing, the screen-printed windows undergo a tempering process. In said operation, the enamel is vitrified, forming a mass with the glass and acquiring the same properties as normal tempered glass, except for its resistance to mechanical and thermal shock, which are conditioned by the amount of enamelled surface, the thickness of the enamels, future expansion, etc.

To date, digitally screen-printed glass has been achieved which shows different motifs and ornamentation, but in no case have embossed surfaces been achieved which present an appearance and surface texture of construction materials such as stone, wood, granite, marble, or porcelain.

Therefore, an object of the present invention is to develop a production method and a product made on a glass substrate that simulates the surface texture of different construction materials such as stone, wood, granite, marble or porcelain, among others, developing a method and product obtained from said method such as the one described below and included in its essence in the first claim.

DESCRIPTION OF THE INVENTION

The object of the present invention is a method for producing a glass substrate with an embossed surface finish that simulates the aesthetic and surface texture of different construction materials, such as stone, wood, granite, marble or porcelain, among others.

The production method comprises the following steps:

Surface abrasion.

Optionally, after surface abrasion, a varnish primer can be applied to the surface subjected to abrasion.

Screen printing process, which will preferably be digital inkjet printing that in a preferred and non-limiting embodiment carries out the mixing of 6 base colours, thus allowing for great variety when making complex designs. Digital screen printing process as a preferred but in no way limiting embodiment, being able to use other methods such as screen printing by roller or screen, among others.

Drying the injected ink deposited by means of digital screen printing or others.

Tempering process, formula optimized to the type of product, with adjustment of heating temperatures, heating and cooling times, the pressure of the cooler and speed of movement of the glass. The tempering process gives the glass the feature of safety glass, since, in case of breakage, it will break into tiny, harmless pieces.

In one possible preferred but in no way limiting embodiment, being able to use other forms of abrasion, it can be used to carry out sandblasting wherein the projection of sandblasting produces mechanical roughing on the surface of the glass substrate.

Due to the combination of the different technical features of the different steps, a construction material made of a glass substrate that presents an embossed surface texture is achieved, which imitates different construction materials (stone, slate, granite, etc.), obtained in a simple way and at a modest cost, being cheaper than the equivalent, naturally occurring material with a similar external aesthetic appearance and equal feel.

Optical similarity is achieved by digital screen printing or other method, while the tactile similarity is achieved thanks to the surface abrasion.

The final product obtained can be available in a wide range of substrates, thickness, measurements, geometries and combinations.

Unless otherwise stated, all technical and scientific elements used in this specification have the meaning commonly understood by a person with ordinary skill in the art to which this invention belongs. In the practice of the present invention, similar or equivalent methods and materials to those described in the specification can be used.

Throughout the description and the claims, the word "comprises" and its variants do not intend to exclude other technical features, additives, components or steps. For those skilled in the art, other objects, advantages and features of the invention may be deduced from both the description and the embodiment of the invention.

EXPLANATION OF THE FIGURES

To complement the description that is being made and for the purpose of helping to better understand the features of the invention, according to a preferred practical exemplary embodiment thereof, a set of drawings is attached as an integral part of said description, wherein the following has been depicted, with an illustrative and non-limiting character.

PREFERRED EMBODIMENT OF THE INVENTION

In view of the figures, a preferred but non-limiting embodiment of the proposed invention is described below.

Figure 1:
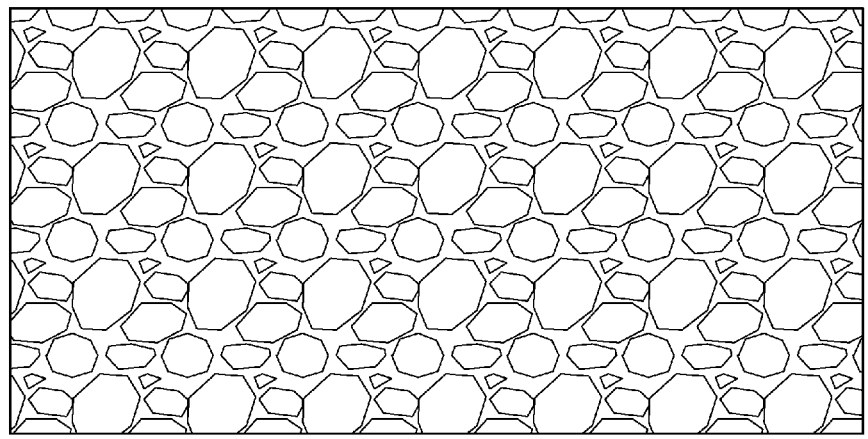
FIG. 1 shows a representation of a possible external appearance of a glass obtained by the method described.

FIG. 1 shows an approximate representation of a glass substrate (1) which has an external appearance equal to that of a construction material such as stone, granite, slate etc. Said external appearance is achieved by the digital screen printing carried out on the previously prepared glass substrate (1).

Figure 2:
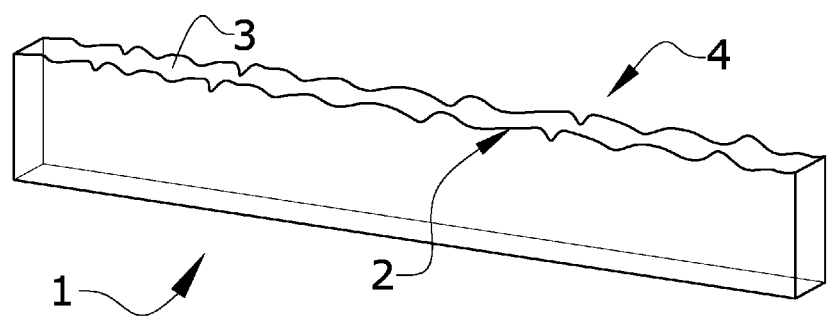
FIG. 2 shows the cross section obtained when cutting the glass treated with the method of the invention wherein the different embossing can be observed.

FIG. 2 shows the cross section obtained when cutting the glass through a vertical plane wherein the surface (2) of the glass substrate (1) is shown which is a rough surface resulting from the surface abrasion process, a primer has been placed on said rough surface (2), which can be optional as mentioned above, and then there is a layer of digitally screen-printed ink (3) which reproduces the roughness provided to the glass and also gives the glass as a whole an outer surface (4) that has a roughness of the order of microns or mm depending on the level of abrasion and an external aesthetic appearance equal to that of a construction material that is to be imitated.

The production method in a possible preferred but non-limiting embodiment comprises the steps of:

Abrasion by means of sandblasting, which is a process of projecting sandblasting that produces mechanical roughing on the surface of the glass substrate.

In a preferred embodiment, the type of sand is "Arabian garnet" which in turn has the following components in a preferred embodiment:

| Component | Formulation | Approximate concentration |
|---|---|---|
| Silicon Oxide | SiO2 | 26.00%-46.00% |
| Calcium Oxide | CaO | 0.5%-1.50% |
| Aluminium Oxide | AlO | 12.5%-32.5% |
| Iron Oxide | FeO | 24%-44.0% |
| Magnesium oxide | MgO | 5%-10% |
| Manganese Oxide | MnO | 0.5%-1.50% |

Wherein the diameter of the sand is between 100 microns and 150 microns in a preferred embodiment.

The projection speed is 250 to 300 m/s.

The amount of sand projected can be between 1300 l/min to 1700 l/min at a pressure of between 4-8 Kg/cm2.

The projection distance is between approximately 120-180 mm. The direction of movement of the projection nozzle is carried out in runs from bottom to top and from top to bottom in horizontal projection with two sandblasts while the piece moves horizontally at a slow speed.

Process of priming the surface subjected to an abrasion process.

Screen printing process, which can be by means of digital inkjet printing or by another method, which in a preferred and non-limiting embodiment carries out the mixing of 6 base colours, thus allowing for great variety when making complex designs.

Wherein screen printing is carried out on a VitroJet F 120/33 Kinetic Side Printing machine in a preferred embodiment.

Drying the injected ink deposited by means of digital screen printing.

Tempering process, formula optimised to the type of product, with adjustment of heating temperatures, heating and cooling times, the pressure of the cooler and speed of movement of the glass. The tempering process vitrifies the paint and gives the glass the feature of safety glass, since, in case of breakage, it will break into tiny, harmless pieces.

Having sufficiently described the nature of the present invention, as well as the way to put it into practice, it is noted that, within its essence, it may be put into practice in other embodiments that differ in detail from that indicated by way of example, and for which the protection sought will also be achieved, as long as it does not alter, change or modify its fundamental principle.

The invention claimed is:

1. A method for producing a glass substrate with an embossed surface finish comprising the following steps:
   abrasion of the glass substrate by sandblasting on one of the faces thereof with sand having 26-46% SiO2, 0.5-1.5% CaO, 12.5-32.5% A1O, 24-44% FeO, 5-10% MgO, and 0.5-1.5% MnO;
   screen printing process on a surface of the face subjected to abrasion;
   drying of the deposited injected ink, and
   tempering process.

2. The method for producing glass with an embossed surface finish according to claim 1, wherein the sandblasting produces mechanical roughing on the surface of the glass substrate.

3. The method for producing glass with an embossed surface finish according to claim 1, wherein a diameter of the sand is between 100 microns and 150 microns.

4. The method for producing glass with an embossed surface finish according to claim 1, wherein a projection speed of the sand is 250 to 300 m/s.

5. The method for producing glass with an embossed surface finish according to claim 1, wherein an amount of sand projected is between 1300 l/min to 1700 l/min at a pressure of between 4-8 Kg/cm2.

6. The method for producing glass with an embossed surface finish according to claim 1, wherein a projection distance is between 120 mm and 180 mm.

7. The method for producing glass with an embossed surface finish according to claim 1, wherein the sand is projected with at least one projection nozzle with a movement that is carried out in runs from bottom to top and from top to down in horizontal projection with two sandblasts while the piece moves horizontally at a slow speed.

8. The method for producing glass with an embossed surface finish according to claim 1 wherein in that the screen printing is carried out by mixing 6 base colours.

9. The method for producing glass with an embossed surface finish according to claim 1 wherein the screen printing is digital inkjet screen printing.

10. The method for producing glass with an embossed surface finish according to claim 1 wherein after abrasion of the substrate and prior to screen printing, a varnish primer is applied to the surface subjected to abrasion.

* * * * *